(12) United States Patent
Reber et al.

(10) Patent No.: US 11,221,250 B2
(45) Date of Patent: Jan. 11, 2022

(54) COMPACT DIRECT MEASURING SYSTEM

(71) Applicant: Mettler-Toledo GmbH, Greifensee (CH)

(72) Inventors: Daniel Reber, Madetswil (CH); Adrian Birrer, Unterstammheim (CH); Christoph Lang, Schwerzenbach (CH)

(73) Assignee: Mettler-Toledo GmbH, Greifensee (CH)

( * ) Notice: Subject to any disclaimer, the term of this patent is extended or adjusted under 35 U.S.C. 154(b) by 185 days.

(21) Appl. No.: 16/800,017

(22) Filed: Feb. 25, 2020

(65) Prior Publication Data

US 2020/0292373 A1 Sep. 17, 2020

(30) Foreign Application Priority Data

Mar. 11, 2019 (EP) .................................... 19161918

(51) Int. Cl.
*G01G 7/02* (2006.01)
*G01G 21/24* (2006.01)

(52) U.S. Cl.
CPC ............... *G01G 7/02* (2013.01); *G01G 21/24* (2013.01)

(58) Field of Classification Search
CPC .................................. G01G 7/02; G01G 21/24
See application file for complete search history.

(56) References Cited

U.S. PATENT DOCUMENTS

| | | |
|---|---|---|
| 3,968,850 A | 7/1976 | Gaskill |
| 4,099,587 A | 7/1978 | Kaufmann |
| 5,850,057 A * | 12/1998 | Veillette ................... G01G 7/02 177/212 |
| 7,429,705 B2 * | 9/2008 | Genoud ............... G01G 21/244 177/21 OEM |
| 7,619,170 B2 * | 11/2009 | Burkhard ............. G01G 21/244 177/21 OEM |
| 7,829,802 B2 * | 11/2010 | Burkhard ............. G01G 21/244 177/21 OEM |
| 2012/0312069 A1 * | 12/2012 | Burkhard ............. G01G 23/012 73/1.13 |

FOREIGN PATENT DOCUMENTS

| | | |
|---|---|---|
| DE | 3136049 A1 | 3/1983 |
| GB | 1324499 | 7/1973 |
| GB | 1571785 | 7/1980 |
| WO | WO-2021099161 A1 * 5/2021 | ........... G01L 1/2243 |

* cited by examiner

*Primary Examiner* — Natalie Huls
(74) *Attorney, Agent, or Firm* — Standley Law Group LLP; Jeffrey S. Standley; Stephen L. Grant

(57) ABSTRACT

An electromagnetic force-compensation direct measuring system (100) has a load receiver (101), which is connected to a force-compensation device (120) via a power-transmission linkage. The system has a multipart parallel guide mechanism, which has at least two parallel-guiding members (131, 132) spaced apart by the power-transmission linkage. The force-compensation device has at least one permanent magnet (121) and a coil (122) electrically connected to a controllable electrical circuit. At least one parallel-guiding member is electrically integrated in the controllable electrical circuit. The power-transmission linkage is designed as a single-part coil body (110) such that the coil is arranged on the coil body between the parallel-guiding members and is electrically connected to the controllable electrical circuit.

16 Claims, 3 Drawing Sheets

Figure 1:
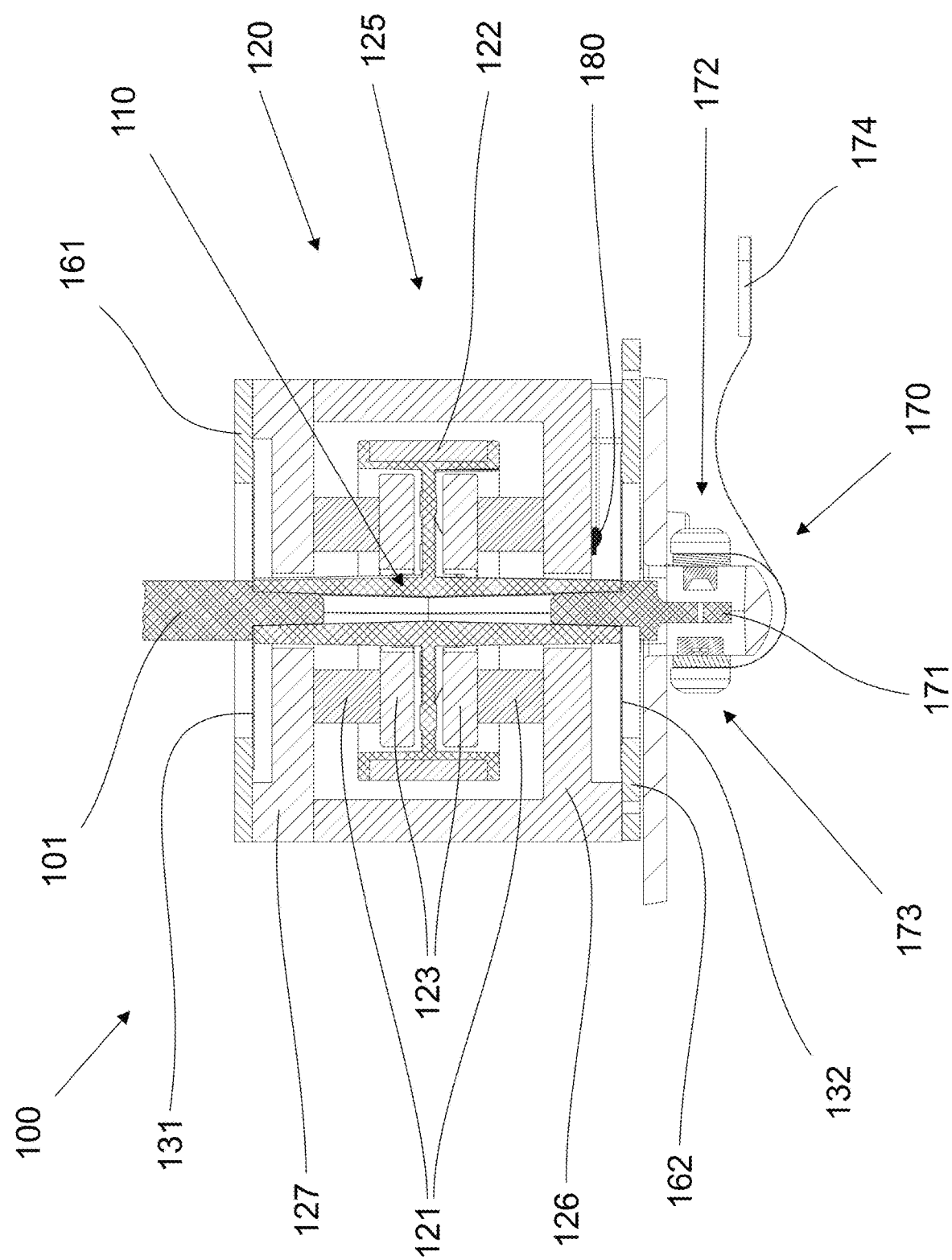

Fig. 3A
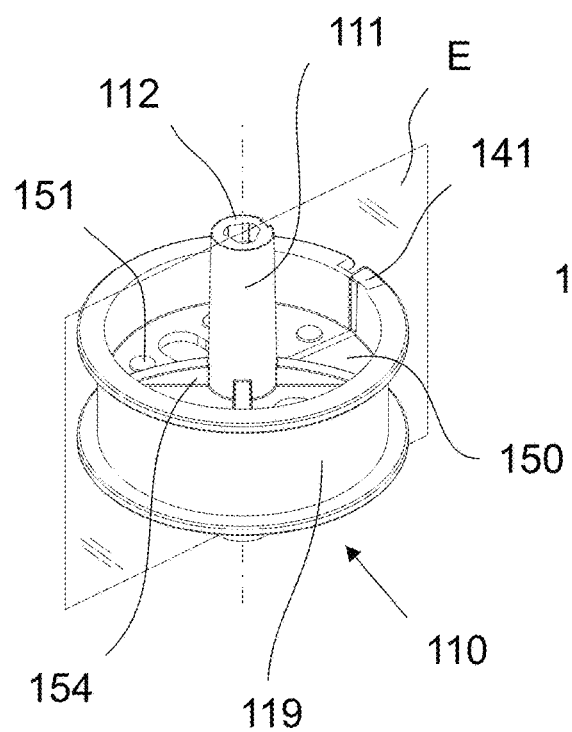
Fig. 3B
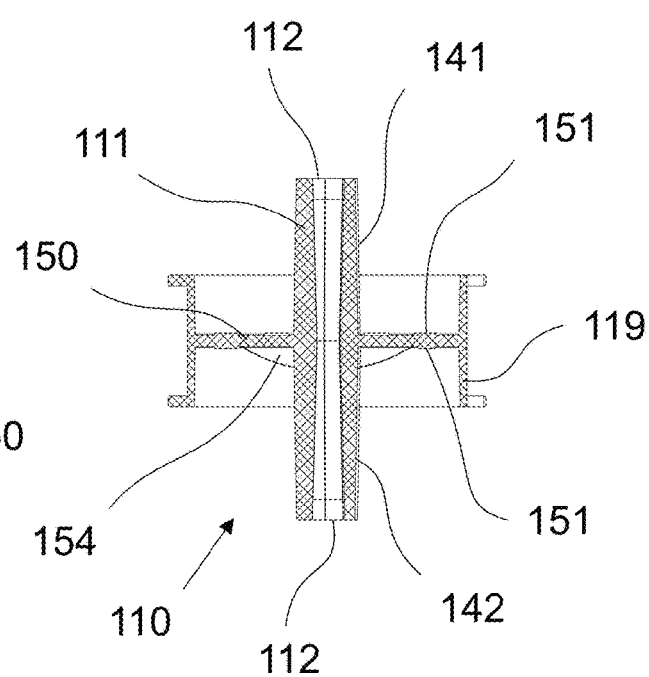
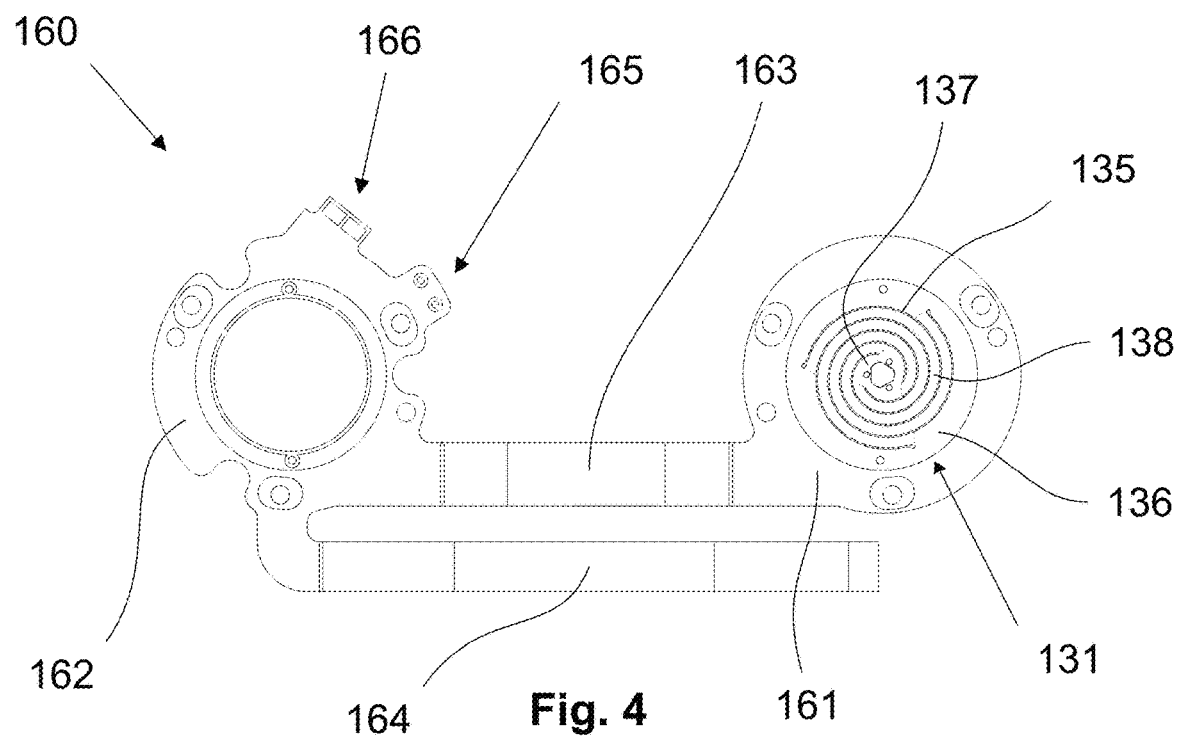
Fig. 4

COMPACT DIRECT MEASURING SYSTEM

CROSS-REFERENCE TO RELATED APPLICATIONS

This application claims the benefit of priority to European patent application 19161918.8, filed on 11 Mar. 2019, which is incorporated by reference as if fully recited herein.

TECHNICAL FIELD

The invention relates to an electromagnetic force-compensation direct measuring system with a load receiver and a force-compensation device, which has a coil and a permanent magnet. An electromagnetic force-compensation direct measuring system, also characterized as a direct measuring system in the following, is characterized in that the load receiver is directly connected to the force-compensation device via a power-transmission linkage.

BACKGROUND OF THE ART

With electromagnetic force compensation, the force that is caused by a load on the scale pan and/or the load receiver is compensated by a force-compensation device, which consists of at least one permanent magnet and a coil, wherein the current flowing through the coil to generate the compensation force is measured. This measured value is proportional to the placed load. However, this measured value is also dependent on the position of the coil in the magnetic field of the permanent magnet and therefore the coil must always have the same position as relates to the magnet when the measured value is recorded. The position of the coil after application of the load is determined by a position sensor, and the current at the coil is increased until the displacement of the coil by the load as relates to the permanent magnet is compensated. In doing so, the measurement of the coil current takes place, which represents a mass for the weight of the placed load.

A direct measurement system is disclosed in CH 593 481 A5. The load receiver is coupled directly to the force-compensation device via a power-transmission linkage in this patent specification. The movable side of the position sensor is attached to the power-transmission linkage, while the fixed side of the position sensor is rigidly connected to the area of the load cell fixed relative to the housing and/or to the fixed area of the force-compensation device.

This direct measuring system is preferably used in the low-load region. The precision of the measurement depends substantially on the resolution and the arrangement of the position sensor in the direct measuring system. The load receiver as well as the coil of the force-compensation device must be guided precisely relative to the fixed area of the load cell. This takes place via a parallel guidance mechanism, the movable parallel leg of which is connected to the power-transmission linkage and the fixed parallel leg of which is rigidly connected to the area of the load cell fixed relative to the housing. The movable parallel leg and the fixed parallel leg are connected to one another through two rigid parallel guides by means of narrow-sectioned elastic bearings. However, spring-loaded parallel guides may also be used; the narrow-sectioned elastic bearings are then omitted. When a load is placed on the load receiver, the power-transmission linkage is displaced in the load direction, which results in a deflection of the parallel guides and which bends the narrow-sectioned elastic bearings or the elastic parallel guides.

Due to its spring constant, the parallel guide mechanism normally has a reset force, which likewise causes a displacement of the coil just like a load placed on the load receiver and which likewise should be compensated.

In U.S. Pat. No. 3,968,850 A, just as in CH 593 481 A5, the coil of the force-compensation device is electrically connected to a controllable electrical circuit via thin wires. The disadvantage with this design is that the wires also establish a mechanical connection from the fixed part to the movable part of the load cell, in addition to the electrical connection. An additional spring constant is thereby incorporated into the direct measuring system, which acts on the parallel guide mechanism and can distort the measurement result. The wires are normally soldered on and are designed especially thinly and delicately in order to keep the additionally occurring spring constant as low as possible. The delicate wires, however, are difficult to attach and one of the wires can quickly come loose and thus the functionality of the scale is lost.

The spring constant, which develops due to the mechanical connection of the movable and of the fixed area of the load cell via the coil electrical circuit, primarily impacts the results of the load cells for the low-load area and/or when there is a high resolution of the weighing result, because even the smallest of changes in the spring constant is sufficient for causing a change in the measurement result.

Parallel guide mechanisms with at least two parallel-guiding members are disclosed in EP 1 726 926 A1 (equivalent to U.S. Pat. No. 7,429,705 B2). These may be, for example, spring-loaded, membrane-like parallel-guiding members, in which both a fixed parallel leg and a moveable parallel leg are formed by suitable perforations, said parallel legs being connected via at least one parallel guide.

Furthermore, it has been shown primarily with compact weighing modules with direct measuring systems for multiple weighing devices, as they are disclosed, for example, in EP 1 726 926 A1, that the zero point drift of a direct measuring system is negatively impacted due to a different thermal expansion of the parts of the parallel guide mechanism connected to the position receiver and/or of the power-transmission linkage.

EP 1 925 919 A1 (equivalent to U.S. Pat. No. 7,619,170 B2) proposes an electromagnetic force-compensation direct measuring system, which has a multipart parallel guide mechanism and a load receiver in which at least one part of the parallel guide mechanism is designed to transmit electrical signals. In this case, the load receiver is connected to a force-compensation device via a power-transmission linkage, said force-compensation device having at least one permanent magnet and a coil electrically connected to a controllable electrical circuit.

In order to determine the position of the coil after the load is applied, the direct measuring system from EP 1 925 919 A1 has a position sensor. The position of the position sensor can be determined with suitable scanning. For example, a gap, which is arranged on the power-transmission linkage, can be used as the position sensor. Various types of scanning are known for controlling the position of the position sensor, wherein optical scanning is preferred. It has been shown that the zero-point drift of a direct measuring system is negatively impacted due to a different thermal expansion of the parts of the parallel guide mechanism connected to the position sensor and/or of the power-transmission linkage. As taught in EP 1 925 919 A1, the position sensor must be arranged substantially in the middle between the upper and the lower parallel-guiding member in order to obtain an electromagnetic force-compensation direct measuring system with a zero-point drift as low as possible. In order to keep the direct measuring system as non-sensitive as possible relative to a zero-point drift, the lower and the upper parallel-guiding members are arranged between the load receiver and the force-compensation device.

The robustness characterizes the ability of a system to withstand changes without adapting its starting stable structure. The robustness of a measuring system is the resistance to forces that are not acting in the direction of the displacement of the coil compared to the permanent magnet, said displacement being caused by the load. Robustness is a requirement for high reproducibility of a load cell, such as, for example, that of a direct measuring system. In order to ensure the required robustness, the parallel-guiding members must be placed at a suitable distance with respect to one another. This distance depends on the expected maximum force component, which can occur deviating from the intended direction of the coil relative to the permanent magnet.

With the aforementioned requirements, there are direct measuring systems on the market today, for example the WMC weighing module from Mettler Toledo, which are compact but have a relatively tall structure. The entire installation height in this case is always determined by the addition of the installation height of the parallel guide mechanism and/or of the power-transmission linkage and the installation height of the force-compensation device.

Thus, the object of the invention is to increase the degree of compactness of an electromagnetic force-compensation direct measuring system and/or to reduce the installation height. Advantageously in this case, the number of installed parts should be reduced and assembly should be simplified.

SUMMARY

This object is achieved with a device having the features indicated in the independent claims. Advantageous embodiments of the invention are indicated in the further, dependent claims.

An electromagnetic force-compensation direct measuring system having a load receiver is known, which is connected to a force-compensation device via a power-transmission linkage and having a multipart parallel guide mechanism, which has at least two parallel-guiding members spaced apart by the power-transmission linkage, wherein the force-compensation device has at least one permanent magnet and a coil electrically connected to a controllable electrical circuit, and wherein at least one parallel-guiding member is electrically integrated in the controllable electrical circuit. According to the invention, the power-transmission linkage is designed as a single-part coil body such that the coil is arranged on said coil body between the parallel-guiding members and is electrically connected to the controllable electrical circuit.

The term "multipart parallel guide mechanism" is used here both in the sense of a parallel guide mechanism, which consists of multiple components, and as a parallel guide mechanism with multiple functional areas and/or active parts.

Due to the formation of the power-transmission linkage as a single-part coil body, it is possible to arrange the coil between the parallel-guiding members in order to obtain a direct measuring system which has a more compact structure.

In a refinement of the invention, the coil body consists of a nonconductive material. Furthermore, the coil body may have at least two conductor tracks electrically isolated from one another, wherein the first conductor track leads to the coil and the second conductor track leads away from the coil. The conductor tracks integrated in the coil bodies simplify assembly of the direct measuring system during the production thereof.

In a further refinement of the invention, the coil body is constructed as a molded interconnect device. Injection-molded plastic components with metallic conductor tracks applied according to a special process and which serve as interconnect devices for electronic and/or mechatronic assemblies are characterized as molded interconnect devices, or MIDs. MIDs can be produced in the most varied of ways. The most important processes for applying the conductor tracks as well as the transmitting and/or shielding surfaces are two-shot injection molding, hot stamping, mask lighting process, direct laser structuring, and in-mold decoration. At a minimum, the material of the coil body may sometimes be a thermoplastic doped with a nonconductive laser-activatable metal connection as the plastic additive, on said thermoplastic the electrical conductor tracks are activated by a laser.

In another refinement, the force-compensation device of the direct measuring system has at least one permanent magnet, at least one pole shoe, and a device housing, wherein the permanent magnet, the pole shoe, and the device housing are durably connected to one another. The coil body in this case is characterized in that it has a shaft region; a winding region for the coil, said winding region extending concentrically with respect to the shaft region; and a bar connecting the shaft region and the winding region; and that the device housing at the same time forms the housing of the direct measuring system, wherein a passage for the coil body is formed at the upper and lower end of the housing. Furthermore, the coil body can be guided through the passage spaced apart with a surrounding gap. This gap defines the maximum horizontal play between the coil body and the device housing, whereby the device housing serves as a horizontal stop for the coil body.

In a refinement of the coil body, at least one knob, which is raised relative to the bar, is formed on the bar, said knob defining a distance to the pole shoe as a maximum vertical play, and thus the pole shoe serves as a vertical stop for the coil body. It may further be provided that at least one stiffening is formed between the shaft region and the bar, and a recess for form-fitting mounting of the at least one stiffening is formed on the pole shoe such that the stiffening and the recess form distortion protection of the coil body relative to the device housing.

The integrative design of multiple functions in one single component reduces the number of installed parts. Thus, no additional assemblies or protective mechanisms which worsen the degree of compactness are to be provided for the inventive direct measuring system.

In a first embodiment of the direct measuring system, the at least one parallel-guiding member electrically integrated in the controllable electrical circuit has two current conductors isolated from one another. In doing so, one conductor track of the coil body is connected to one current conductor of the at least one parallel-guiding member in each case.

In a second embodiment, the direct measuring system has two parallel-guiding members electrically integrated in the controllable electrical circuit. In a first variant, one respective conductor track of the coil body is connected to the current conductor of one respective link of the two parallel-guiding members. In a second variant, the two parallel-guiding members consist completely of an electrically conductive material or have at least one electrically conductive surface, wherein the coil body has a respective end surface on the ends thereof, said end surface being formed respectively as a contact point electrically connected to one of the two conductor tracks, via said end surfaces the respective parallel-guiding member is contacted and thus is electrically integrated in the controllable electrical circuit.

According to the invention, the surfaces which are situated at the upper and lower end of the shaft region at a right angle to the axis of rotation and which are provided to establish contact with the parallel-guiding members are characterized as the end surfaces. Complex wiring and soldering work can be dispensed with due to the contacting and thus the establishing of an electrically conductive connection between the end surfaces and the parallel-guiding members in a direct form and manner.

Furthermore, the force-compensation device may have a device housing, wherein both a fixed parallel leg and a moveable parallel leg are formed by suitable perforations, said parallel legs being connected via at least one parallel guide. According to a first refinement, the parallel-guiding members are durably attached, at the fixed parallel legs thereof, to the device housing by means of an electrically isolating adhesive or to the device housing on an electrically isolating intermediate layer by means of an adhesive. In a second refinement, the parallel-guiding members are durably soldered, at the fixed parallel legs thereof, on a respective circuit board, the parallel-guiding members are a component of the respective circuit board, and the circuit boards are then attached to the device housing by means of screws or by means of adhesive. This second refinement can be improved to the extent that the circuit boards are formed as a single-part circuit board module connected through a flexible conductive strip.

The direct attachment of a parallel-guiding member to the device housing minimizes the number of parts even more significantly. If circuit boards or one circuit board module is used intermediately, an increased number of components must be accepted, but an all the more improved design with respect to simplification of assembly and improved mechanical connection between the parallel-guiding members and the device housing is obtained in return, because the soldered connections have even better durability than adhesive connections. It can be considered a great advantage that a parallel-guiding member can be soldered into the circuit board or the circuit board module before the actual assembly of the direct measuring system. Solder or adhesive work at the assembly site is then dispensed with.

In a refinement of the direct measuring system with a position sensor, the position sensor is arranged either over the upper parallel-guiding member or below the lower parallel-guiding member in the state configured for operation.

BRIEF DESCRIPTION OF THE INVENTION

Figure 2B:
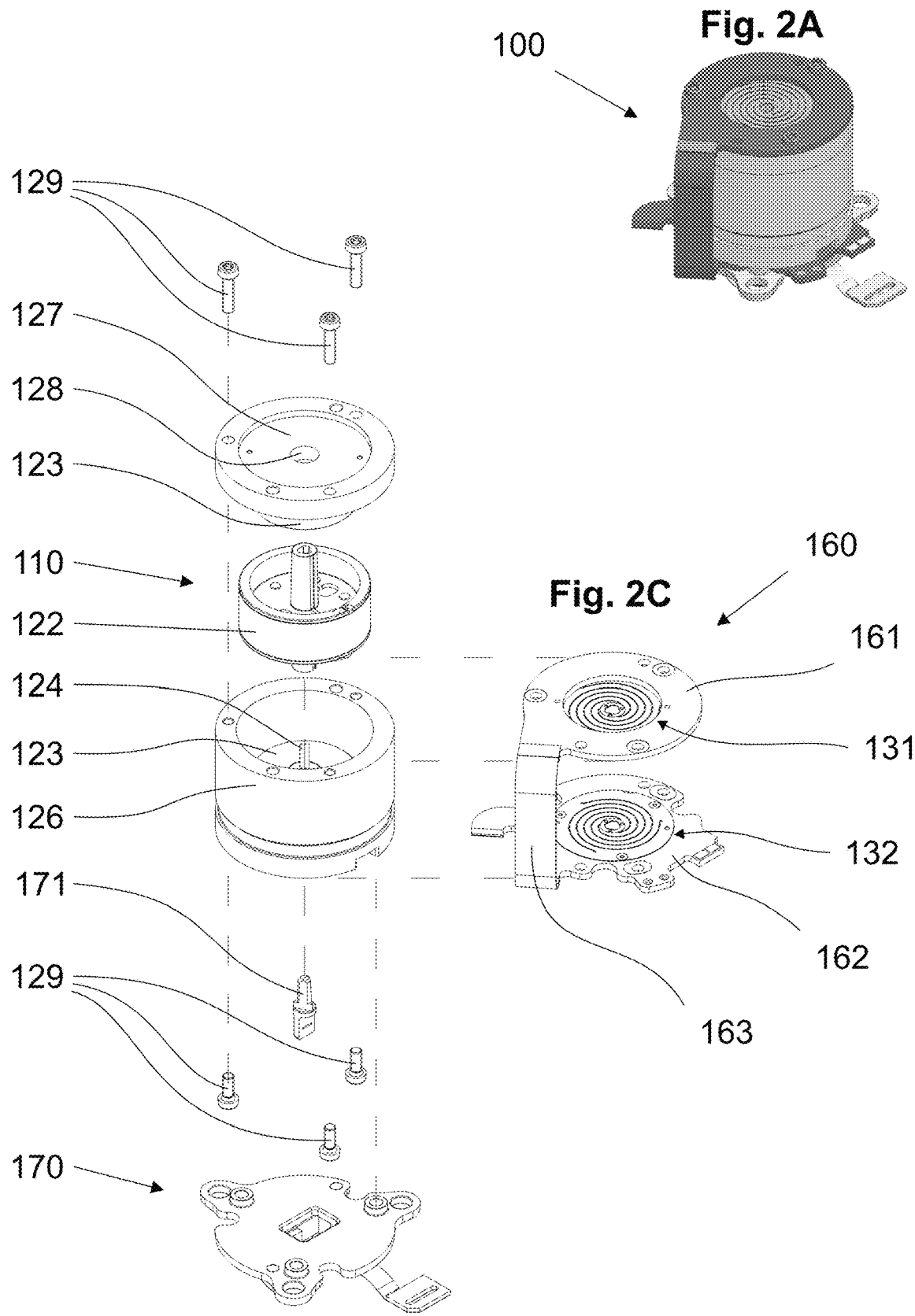
Figure 2A:
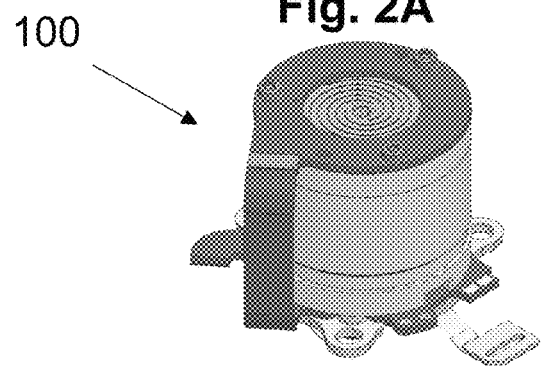
Figure 2C:
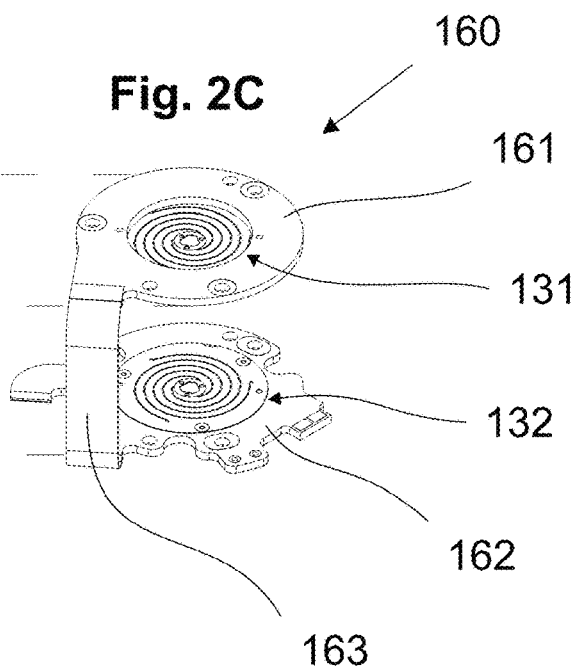

Individual details of the force-measuring device according to the invention result by means of the description of the exemplary embodiments shown in the figures. The following is shown: FIG. 1 is a section of a direct measuring system with a load receiver, a power-transmission linkage, a parallel guide mechanism, and a force-compensation device; FIG. 2A is a perspective view of the direct measuring system in the assembled state; FIG. 2B is an exploded view of the direct measuring system; FIG. 2C is a circuit board module as part of the exploded view from FIG. 2B; FIG. 3A is a perspective view of the power-transmission linkage as a single-part coil body; FIG. 3B is a sectional view of the coil body from FIG. 3A through plane E; and FIG. 4 is a circuit board module as in FIG. 2C, in a planar, flat view.

DETAILED DESCRIPTION OF THE EMBODIMENTS

Features with the same function and similar design are given the same reference signs in the following description.

The direct measuring system 100 in FIG. 1 is shown in a section and has a load receiver 101, which is connected to a position sensor 170 via a power-transmission linkage 110. The load receiver 101, the coil 122 of the force-compensation device 120, as well as the shutter vane 171 of the position sensor 170 are precisely guided relative to the device housing 125 of the force-compensation device 120. This takes place via a multipart parallel guide mechanism, which comprises two parallel-guiding members 131, 132, the structure of which is explained in more detail by means of FIG. 4. The movable parallel legs 137 (see FIG. 4) of the two parallel-guiding members 131, 132 are attached at the power-transmission linkage 110, while the fixed parallel legs 136 (see FIG. 4) are rigidly connected to the device housing 125 of the force-compensation device 120 by means of a respective circuit board 161, 162.

The force-compensation device 120 in this case consists of two permanent magnets 121, between which a two-part pole shoe 123 is arranged. The divided pole shoe 123 is surrounded by a coil 122, which moves in the air gap between the previously mentioned pole shoe 123 and the housing body 126 of the device housing 125. The power-transmission linkage in this case is formed as a single-part coil body 110 and thus combines the functions of a simple power-transmission linkage and those of a coil body, as is shown, for example, in FIGS. 1 and 2 of EP 1 925 919 A1.

The two parallel-guiding members 131, 132 are each attached to a circuit board 161, 162, which is then connected to the housing cover 127 or the housing body 125 of the device housing 125 of the force-compensation device 120. The direct measuring system 100 is then designed with suitable conductor tracks and contact points on the circuit boards 161, 162, the parallel-guiding members 131, 132, and the coil body 110 such that the coil 122 is electrically connected to the controllable electrical circuit. In this manner, the coil current is guided to the coil 122 and diverted without having to establish an additional mechanical connection between the fixed and the movable area of the direct measuring system 100.

The control of the position of the load receiver 101 which is used in this case is optical scanning. Light, which is emitted from the light emitter 172 through the slot of the shutter vane 171, hits the light receiver 173, which generates a position signal corresponding to the position of the shutter vane 171 and/or of the load receiver 101. The signal of the position sensor 170 is accessible at the connecting tab 174.

A temperature sensor 180 provides a temperature signal, which can be used in the processing unit to compensate for deviations due to thermal influences when calculating the force acting on the load receiver 101.

FIG. 2A shows the direct measuring system 100 in a perspective view and in the assembled state. After combining of the components shown in the exploded view of FIG. 2B and in FIG. 2C, an electromagnetic force-compensation direct measuring system with a high degree of compactness is obtained. The number of components is also clear, because the device housing 125 of the force-compensation device 120 at the same time forms the outer shell of the direct measuring system 100.

The exploded view in FIG. 2B shows the direct measuring system 100 from FIG. 1. The permanent magnet (not visible) and the lower part of the pole shoe 123 are already arranged in the housing body 126. This pole shoe 123 has recesses 124, in which the stiffening 154 of the coil body 110 (see FIGS. 3A and 3B) comes to rest. The coil body 110 with coil 122 is thereby aligned in a defined manner and protected against distortion. A further permanent magnet (not visible) and the upper part of the pole shoe 123 are attached underneath the housing cover 127. This pole shoe 123 may likewise have recesses. The housing cover 127 and the housing body 126 each have a passage 128 for the coil body 110 in order to connect to the parallel-guiding members 131, 132 (FIG. 2C).

Because the housing body 126 and the housing cover 127 are also intended to guide the magnetic field lines, they should be considered part of the magnet system. The housing body 126 and housing cover 127 are produced from a metallic material for a strong and homogenous magnetic field. When the coil current is supplied and drawn off via at least one parallel-guiding member 131, 132, it obviously must be electrically isolated from the housing body 126 and/or housing cover 127.

The circuit board module 160 shown in FIG. 2C is placed around the device housing 125 and durably connected thereto by means of housing screws 129. The circuit boards 161, 162 isolate the corresponding parallel-guiding member 131, 132 from the housing body 126 and/or from the housing cover 127. A soldered connection at the contact points of the coil body 110 and the parallel-guiding members 131, 132 ensures the development of the exact guiding of the coil body 110 within the force-compensation device 120 here.

The shutter vane 171 is attached to the coil body 110 from below and positions itself eventually in the optical axis between the light emitter 172 and the light receiver 173. The position sensor 170 is placed attached to the housing body 125 from below.

FIG. 3A and FIG. 3B show the same power-transmission linkage formed as a single-part coil body 110; they are described essentially jointly in the following. They are shown once in a perspective view (FIG. 3A) and as a section through plane E extending along the axis of rotation (FIG. 3B).

The coil body 110 has a shaft region 111 along the axis of rotation and between the surfaces 112, said shaft region, in turn, being connected to a winding body 119 via a bar 150. Viewed in isolation, the winding body 119 has the shape of a ring with a rotational cross-section of a rectangle provided with a recess. The coil wire is wound into a coil (122, FIG. 1) in this circumferential recess. The bar 150 is positioned symmetrically between the front sides 112 of the shaft region 111 here. Other arrangements would also be possible such as, for example, on the upper or lower end of the winding body 119, wherein the permanent magnet 121 and the pole shoe 123 would have to be adapted in association with this.

Knobs 151 are arranged on the upper and lower surface of the bar 150. These knobs 151 have a parallel surface that is slightly raised relative to the bar 150, said surface defining a distance to the pole shoe 123 as a maximum vertical play in the assembled state of the direct measuring system such that an excessive displacement and/or deflection of the coil body 110 does not cause any damage at the parallel-guiding members. For protection against distortion of same, four stiffenings 154 are formed here between the shaft region 111 and the bar 150 on both sides thereof. In the assembled state, these stiffenings 154 are mounted in the recesses 124 of the pole shoe 123, said recesses being mentioned previously with respect to FIG. 1. Of course, other arrangements and quantities of stiffenings 154 are also conceivable, as shown in FIGS. 3A and 3B.

Furthermore, FIG. 3A and FIG. 3B of the embodiment of the coil body 110 show the isolated electrical conductor tracks 141, 142. The first conductor track 141 extends from the upper end surface 112 over the shell surface of the shaft region 111, the upper surface of the bar 150, and over the inner side of the winding body 119 to a contact surface on the upper front side of the winding body 119. The second conductor track 142 extends from the lower end surface 112, in the same form and manner, to a contact surface on the lower front side of the winding body 119. The ends of the coil wire are attached to these two contact surfaces, wherein the coil 122 can then be supplied with current through contact of the end surfaces 112 with the parallel-guiding members.

The course of the isolated electrical conductor tracks 141, 142 can also be arranged on the same side of the bar 150, wherein the parallel-guiding member then situated on the side of the bar 150 has two current conductors isolated from one another such that each conductor track 141, 142 is connected to a respective current conductor of the parallel-guiding member. The design of these current conductors has been extensively described in EP 1 925 919 A1.

FIG. 4 shows the circuit board module 160 as it has already been seen in FIG. 2C but in a planar, flat view. The upper circuit board 161 and the lower circuit board 162, which are connected through the conductive strip 163, are oriented next to one another with the side toward the observer, said side being in contact with the device housing 125 in the assembled state. The circuit boards 161, 162 each have a recess for mounting the respective parallel-guiding member 131, 132, wherein only the upper parallel-guiding member 131 is shown here in FIG. 4. The respective parallel-guiding members are connected to the current source via two current conductors, which are isolated from one another, and which lead through the flexible conductive strip 163 and a flexible current supply strip 164. Further contact points 165, 166, for example for the temperature sensor 180 or the position sensor 170 (both in FIG. 1), can be integrated in a circuit board 161, 162 and/or a circuit board module 160. The signal is then also accessible at the end of the current supply strip 164.

By means of the upper parallel-guiding member 131 shown in FIG. 4, the design of the parallel-guiding members shown in FIGS. 1, 2A, and 2C will now be briefly discussed. FIG. 4 shows a top view of the upper parallel-guiding member 131, which has three spiral perforations 135 here, through which a movable parallel leg 137, which can be connected to the coil body 110; a fixed parallel leg 136, which can be connected to the device housing 125; as well as three parallel guides 138 connecting the fixed and the movable parallel leg are formed. The coil body 110, as shown in FIG. 1, is thusly guided into the passages 128 of the device housing 125.

EP 1 925 919 A1 likewise shows further possible designs of parallel-guiding members such as, for example, parallel-guiding members with two electrical conductor tracks; parallel-guiding members from an electrical isolator, to which an electrically conductive material is applied to form the conductor tracks; or parallel-guiding members which have U-shaped perforations. The previously described elements of the embodiment of the coil body and the parallel-guiding members may be combined with one another in any form and manner solely with the proviso that in the end of the coil is electrically connected to the controllable electrical circuit.

What is claimed is:

1. An electromagnetic force-compensation direct measuring system comprising:
   a force compensation device having at least one permanent magnet and a coil electrically connected to a controllable electrical circuit;
   a load receiver, comprising a multipart parallel guide mechanism, which has at least two parallel-guiding members, with at least one of the parallel-guiding members electrically integrated in the controllable electrical circuit; and
   a power-transmission linkage which connects the load receiver to the force-compensation device and which spaces the at least two parallel-guiding members apart, the power-transmission linkage being electrically connected to the controllable electrical circuit and designed as a single-part coil body with the coil arranged on the coil body between the parallel-guiding members.

2. The direct measuring system according to claim 1, wherein the coil body consists of a nonconductive material.

3. The direct measuring system according to claim 2, wherein:
   the coil body has at least two conductor tracks electrically isolated from one another, a first of the conductor tracks leading to the coil and a second of the conductor tracks leading away from the coil.

4. The direct measuring system according to claim 3, wherein:
   the material of the coil body is at least partially a thermoplastic doped with a nonconductive laser-activatable metal connection as the plastic additive, on said thermoplastic the electrical conductor tracks are activated by a laser.

5. The direct measuring system according to claim 1, wherein:
   the force-compensation device comprises:
   at least one permanent magnet,
   at least one pole shoe, and
   a device housing, such that the permanent magnet, the pole shoe, and the device housing are durably connected to one another, and
   the coil body has a shaft region, a winding region for the coil that extends concentrically with respect to the shaft region, and a bar that connects the shaft region and the winding region, such that the device housing at the same time forms the housing of the direct measuring system, wherein a passage for the coil body is formed at an upper end and a lower end of the housing.

6. The direct measuring system according to claim 5, wherein:
   the coil body is guided through the passage spaced apart with a surrounding gap which defines a maximum horizontal play between the coil body and the device housing.

7. The direct measuring system according to claim 5, wherein:
   at least one knob, which is raised relative to the bar, is formed on the bar, and defines a distance to the pole shoe as a maximum vertical play.

8. The direct measuring system according to claim 5, wherein:
   at least one stiffening is formed between the shaft region and the bar; and
   a recess for mounting of the at least one stiffening is formed on the pole shoe such that the stiffening and the recess protect the coil body from distortion relative to the device housing.

9. The direct measuring system according to claim 3, wherein:
   the at least one parallel-guiding member electrically integrated in the controllable electrical circuit has two current conductors isolated from one another, such that each conductor track of the coil body is connected to a respective current conductor of the at least one parallel-guiding member.

10. The direct measuring system according to claim 3, wherein:
    two parallel-guiding members are electrically integrated in the controllable electrical circuit, such that each conductor track of the coil body is connected to the current conductor of one respective link of the two parallel-guiding members.

11. The direct measuring system according to claim 10, wherein:
    the two parallel-guiding members that are electrically integrated in the controllable electrical circuit consist completely of an electrically conductive material or have at least one electrically conductive surface, the coil body has a respective end surface on the ends thereof, said end surface being formed respectively as a contact point electrically connected to one of the two conductor tracks via said end surfaces the respective parallel-guiding member is contacted and is thereby electrically integrated in the controllable electrical circuit.

12. The direct measuring system according to claim 1, further comprising:
    a device housing of the force-compensation device; and
    for each of the parallel-guiding members, a fixed parallel leg and a moveable parallel leg, formed in the parallel-guiding member by suitable perforations, with at least one parallel guide that connects said parallel legs, wherein the parallel-guiding members are durably attached to the device housing, at the fixed parallel legs thereof,
    by means of an electrically isolating adhesive; or
    on an electrically isolating intermediate layer by means of an adhesive.

13. The direct measuring system according to claim 1, further comprising:
    a device housing of the force-compensation device; and
    for each of the parallel-guiding members, a fixed parallel leg and a moveable parallel leg, formed in the parallel-guiding member by suitable perforations, with at least one parallel guide that connects said parallel legs, wherein the parallel-guiding members are durably soldered, at the fixed parallel legs thereof, on a respective circuit board and the parallel-guiding members are a component of the respective circuit board, and that the respective circuit boards are attached to the device housing by means of screws or by means of adhesive.

14. The direct measuring system according to claim 13, wherein:
    the circuit boards are formed as a single-part circuit board module connected through a flexible conductive strip.

15. The direct measuring system according to claim 1, further comprising:
    a position sensor, such that, in an operative configuration with one of the parallel-guiding members arranged above the other, defining an upper parallel-guiding member and a lower parallel-guiding member, the position sensor is arranged either over the upper parallel-guiding member or below the lower parallel-guiding member.

16. The direct measuring system according to claim 1, wherein:
   the coil body has at least two conductor tracks electrically isolated from one another, a first of the conductor tracks leading to the coil and a second of the conductor tracks leading away from the coil.

* * * * *